United States Patent [19]

Lee, Jr. et al.

[11] 3,905,110

[45] Sept. 16, 1975

[54] COMPOSITION AND METHOD FOR DRYING DENTAL SURFACES

[75] Inventors: Henry L. Lee, Jr., Pasadena; Jan A. Orlowski, Altadena, both of Calif.

[73] Assignee: Lee Pharmaceuticals, South El Monte, Calif.

[22] Filed: Nov. 3, 1972

[21] Appl. No.: 304,981

[52] U.S. Cl. .......................................... 32/15; 32/15
[51] Int. Cl. ................................................ A61c 9/00
[58] Field of Search ............................ 106/35; 32/15

[56] References Cited
UNITED STATES PATENTS 3,471,927   10/1969   Eisenberg ................................. 32/15
3,507,041   4/1970   Walraven et al. ......................... 32/15

*Primary Examiner*—Robert Peshock
*Attorney, Agent, or Firm*—Irons & Sears

[57] ABSTRACT

A blend of solvents, at least one of the solvents forming a low boiling azeotrope with water and at least one other solvent being miscible with water, which may contain a nonvolatile component which produces a hydrophobic film upon evaporation of the solvent. The solvent blend with or without the nonvolatile compound is useful as a drying agent for tooth surfaces.

5 Claims, No Drawings

COMPOSITION AND METHOD FOR DRYING DENTAL SURFACES

BACKGROUND OF THE INVENTION

1. Field of the Invention

This invention relates to dental materials and processes. More specifically, the invention relates to a solvent blend useful for drying the surface of hard dental tissue.

2. Description of the Prior Art

In the application of resinous dental materials as restoratives and cements, where adhesion is required to hard dental tissue, it is necessary to insure that the tissue in contact with the resinous material during cure is thoroughly dry. The presence of moisture at the interface inhibits through wetting and results in poor adhesive retention with time. Hard dental tissue is conventionally dried in vivo by use of a stream of warm, compressed air for variable periods of time. Lee (J. Biomed. Mats. Res 3:349–367, 1969) reported that it is also "common practice to use acetone or similar solvents to degrease and dry cavity preparations." Zisman (U.S. Public Health Service Pub. No. 1494, 1966, pp. 21–37) has suggested water displacing agents, such as n-butanol, as possible agents for drying hard dental tissue. Lee et al., (J Dent Res 50: 125–132, 1971) have employed excess isocyanate to scavenge water from hard dental tissue in an in vivo drying procedure.

The above procedures are not entirely satisfactory. Use of compressed air requires a rigorously dry air supply and an extended drying period. Degreasing solvents do not necessarily provide for thorough drying. Displacing agents permit water to return to the site upon evaporation of the solvent and can also act as a release agent on the tooth surface to prevent subsequent adhesion. Isocyanates are useful only in connection with adhesive systems with which they are compatible.

In non-dental applications it has been proposed to increase the rate of evaporation of one solvent by combining it with a volatilizing agent. Thus in Kirschner U.S. Pat. No. 3,445,564 a volatile organic liquid, such as acetone, is incorporated into a germicidal alcohol composition in order to increase the rate of evaporation of the alcohol. However acetone does not form an azeotropic mixture with water. Moreover prior to this invention it has never been suggested that such a solvent blend could be used to dry a moist surface.

In dentistry it is known to apply cavity liners to prepare the tooth surface for receiving the resinous material. However they are not applied for the purpose of keeping the tooth surface free from moisture. U.S. Pat. No. 3,471,927 discloses that these liners may be applied from a solution having a lower aliphatic solvent and cautions the ratio of the ingredients must be sufficient "to prevent dehydration of the tooth material by the aliphatic alcohol."

SUMMARY OF THE INVENTION

The objects of this invention include providing: a composition of matter for rapidly and thoroughly drying hard tooth surfaces in vivo; the inclusion of a nonvolatile ingredient in the composition which will produce a hydrophobic film on the tooth surface, thus maintaining the tooth surface substantially free of moisture after the drying operation is complete; and a method of achieving this rapid and thorough drying of tooth structure.

These and other objects are achieved along with an increase in bond strength between the treated surface and a subsequently applied dental cement or restorative material by applying a blend of low boiling solvents to the tooth surface and permitting it to evaporate, thereby removing any moisture on the surface. At least one of the solvents is capable of forming a low boiling azeotrope with water, and at least one other is miscible with water. The application of this combination of solvents achieves a rapid and substantially complete evaporation of moisture from the treated surface. In a preferred embodiment a minor amount of a nonvolatile component, which remains as a thin hydrophobic film on the hard dental tissue after the solvent blend has evaporated, is incorporated in the composition. This film maintains the coated surface in a substantially dry condition until a dental cement or restorative is applied.

DESCRIPTION OF THE PREFERRED EMBODIMENTS

In order to achieve the objects of this invention, the components of the solvent blend must meet certain criteria. They, of course, must be nontoxic in the amounts applied to the tooth and the blend must evaporate rapidly at the temperature of a patient's mouth, when in admixture with the moisture of the tooth surface.

The solvent which forms an azeotrope with water should have a low boiling point, preferably less than about 45° C. The preferred solvent is diethyl ether. However, other materials which form low boiling azeotropic solution with water may also be used. Examples of these materials are ethanol and ethylene chloride.

The water miscible solvent should boil at relatively low temperature. It should also be easily miscible with water. The preferred solvents of this class are acetone and other lower molecular weight ketones. Other solvents having the required boiling point and water miscibility can be used provided that they are nontoxic in the concentrations applied. These additional solvents include methanol and ethanol or the mixture thereof.

The solvent blends are prepared by the simple admixture of the two materials. A mixture having a ratio of from 1:5 to 5:1 by weight of azeotrope solvents to water miscible solvents produce the desired results. The blends most suitable for practice of the invention are those having a weight ratio of 1:2 to 2:1 of substantially anhydrous acetone or ethanol to diethyl ether.

The preferred embodiment of the invention includes the incorporation into the solvent system of a nonvolatile component which, upon evaporation of the solvent, forms a thin hydrophobic film on the dental tissue. This component is preferably present in an amount of from about 0.5 to about 10 percent by weight. Although not required, it is preferred that the film forming component should contain groups which are functional or compatible with the adhesive material which is to be applied to the tooth surface subsequent to the drying operation. Thus, where acrylic or diacrylate resins are to be used as a cement or restorative material, the functional groups of the nonvolatile component should be reactive with these resins in the presence of a peroxide or free radical catalyst. For these resins the component may be methyl methacrylate or a diacrylate, such as ethylene glycol dimethacrylate and glycerophosphoric acid dimethacrylate. Other nonvolatile components include the organofunctional silanes which are hydrophobic and contain moieties capable of reaction with or incorporation into the body of the subsequently applied cement or restorative materials, such as a gamma-methacryloxypropyl trimethoxy silane. This film is reactive with vinyl-group containing molecules and is preferably present in the solvent blend in a concentration of from about 0.5 to 1 percent by weight. Other nonvolatile components which are compatible with the following resins include all vinyl-groups containing silanes.

The following examples illustrate specific embodiments of the invention:

EXAMPLE I

A surface of human enamel in vitro was conditioned with 50% phosphoric acid to provide a surface suitable for accepting the adhesive. The surface was then rinsed copiously with water and gross moisture was removed with a stream of compressed air. A drying solution prepared by mixing 100 ml. of dry, reagent grade acetone and 100 ml. of dry, reagent grade diethyl ether was applied to the tooth surface. After 15 seconds the treated surface was coated with a catalyzed diacrylate composite restorative which was allowed to cure for 3 minutes.

The same procedure was followed in preparing a second specimen except that the tooth surface was thoroughly dried with compressed air and no drying solution was applied.

Both specimens were tested in tension. The surface treated with the drying solution had a bond strength of 1000 psi while the specimen dried in air only had a bond strength of 600–800 psi.

EXAMPLE II

Specimens were prepared and tested as in Example I except that the drying solution used was a blend of 100 ml. dry, reagent grade ethanol and 100 ml. dry, reagent grade diethyl ether. The solvent dried tooth had a bond strength of 1000 psi. In contrast, the air-dried surface had a bond strength of 600–800 psi.

EXAMPLE III

One percent by weight of the organofunctional silane, gammamethacryloxypropyl trimethoxy silane was added to the solution employed in EXAMPLE I. After treating an enamel surface in the same manner as in the previous examples using this new solvent blend, a tooth-restorative interface had a bond strength of 1100–1300 psi.

EXAMPLE IV

Five percent by weight of ethylene glycol dimethacrylate was added to the solution of Example I. After treating a tooth by the procedure followed in the previous examples using the ethylene glycol dimethacrylate containing solvent, the bond strength of the restorative enamel interface was 1100–1300 psi.

These examples illustrate that the use of the solvent blend of this invention to dry tooth surfaces resulted in increased bond strengths at the interface of the treated tooth surface and a subsequently applied resin over those obtained by the conventional air drying technique. Furthermore, the examples illustrate that the solvent blend containing the nonvolatile film forming component result in even higher bond strength than those achieved with the solvent blend alone.

What is claimed is:

1. A method of drying hard tooth surfaces comprising applying a solvent blend, comprising at least one solvent capable of forming an azeotropic solution with water and at least one other solvent which is substantially completely miscible in water, to a tooth surface and then permitting said blend to evaporate.

2. The method of claim 1 wherein said azeotrope forming solvent is diethyl ether and said water miscible solvent is substantially anhydrous acetone methanol or ethanol.

3. The method of claim 2 wherein said azeotrope forming and water miscible solvents are present in the ratio of from about 1:2 to about 2:1 by weight.

4. The method of claim 3 wherein said blend further comprises a nonvolatile hydrophobic film forming component in a concentration of 0.5 to 10 percent by weight.

5. The method of claim 4 wherein said nonvolatile component is glycerophosphoric acid dimethacrylate, gamma-methacryloxypropyl trimethoxy silane or ethylene glycol dimethacrylate.

* * * * *